United States Patent
Hatama et al.

(10) Patent No.: US 9,358,498 B2
(45) Date of Patent: Jun. 7, 2016

(54) MIXED AIR REMOVAL DEVICE AND POWER GENERATOR INCLUDING THE SAME

(71) Applicant: FUJI ELECTRIC CO., LTD., Kawasaki (JP)

(72) Inventors: Mikiko Hatama, Kawasaki (JP); Kokan Kubota, Kawasaki (JP); Yoshitaka Kawahara, Kawasaki (JP); Hiroaki Shibata, Kawasaki (JP); Ichiro Myogan, Kawasaki (JP); Isamu Osawa, Kawasaki (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 236 days.

(21) Appl. No.: 14/350,648

(22) PCT Filed: Oct. 19, 2012

(86) PCT No.: PCT/JP2012/006703
§ 371 (c)(1),
(2) Date: Apr. 9, 2014

(87) PCT Pub. No.: WO2013/057956
PCT Pub. Date: Apr. 25, 2013

(65) Prior Publication Data
US 2014/0238023 A1    Aug. 28, 2014

(30) Foreign Application Priority Data

Oct. 19, 2011   (JP) ................................. 2011-229749

(51) Int. Cl.
*F01K 13/02*   (2006.01)
*F01K 25/08*   (2006.01)
(Continued)

(52) U.S. Cl.
CPC .............. *B01D 53/229* (2013.01); *B01D 53/22* (2013.01); *F01K 9/00* (2013.01); *F01K 9/003* (2013.01);
(Continued)

(58) Field of Classification Search
CPC .................. B01D 53/229; B01D 53/22; B01D 2053/221; F01K 25/08; F01K 9/003; F01K 19/00; F01K 9/00; F25J 3/0605
USPC ........... 60/646, 651, 657, 671, 690, 692, 694; 62/617; 96/4
See application file for complete search history.

(56) References Cited

U.S. PATENT DOCUMENTS 4,894,927 A * 1/1990 Ogawa .................... F26B 3/283
                                                                    34/507
5,113,927 A    5/1992 Kedar et al.
(Continued)

FOREIGN PATENT DOCUMENTS

JP    62-026304    2/1987
JP    03-056113    3/1991
(Continued)

OTHER PUBLICATIONS

Iceland search report, dated Oct. 6, 2014, in corresponding Icelandic Patent Application No. 050079.
(Continued)

*Primary Examiner* — Hoang Nguyen
(74) *Attorney, Agent, or Firm* — Young & Thompson

(57) ABSTRACT

A device for automatically detecting and removing air from a gas mixture of an organic gas and air includes calculating a saturation pressure value based on a temperature of the gas mixture in a reservoir 1, and obtaining a pressure threshold value by adding a margin value to the saturation pressure value. When the pressure value inside the reservoir 1 is higher than the pressure threshold value, air is detected to be in the gas mixture. After this detection, a controller 5 pressurizes and introduces the gas mixture into a pressure container 2 to condense the organic gas in the gas mixture, thus producing a diluted gas mixture. Subsequently, the diluted gas mixture is introduced to a supply side of a membrane unit 3, the organic gas in the diluted gas mixture is recovered at a permeation side thereof, and a residual gas is discharged outside of the device.

11 Claims, 4 Drawing Sheets

(51) Int. Cl.
*B01D 53/22* (2006.01)
*F01K 9/00* (2006.01)
*F01K 19/00* (2006.01)
*F25J 3/06* (2006.01)

(52) U.S. Cl.
CPC ............... *F01K 19/00* (2013.01); *F01K 25/08* (2013.01); *F25J 3/0605* (2013.01); *B01D 2053/221* (2013.01)

(56) References Cited

U.S. PATENT DOCUMENTS

| | | | |
|---|---|---|---|
| 5,119,635 A | 6/1992 | Harel | |
| 5,487,765 A | 1/1996 | Kedar et al. | |
| 5,571,310 A * | 11/1996 | Nanaji | B01D 53/22 55/310 |
| 5,928,409 A * | 7/1999 | Sirkar | B01D 53/22 95/45 |
| 6,719,824 B1 * | 4/2004 | Bowser | B01D 53/22 95/47 |
| 7,260,934 B1 * | 8/2007 | Roberts | F01K 13/02 60/651 |
| 2014/0190165 A1 * | 7/2014 | Myogan | F01K 9/00 60/657 |

FOREIGN PATENT DOCUMENTS

| | | |
|---|---|---|
| JP | 04-131118 | 5/1992 |
| JP | 04-180811 | 6/1992 |
| JP | 04-219113 | 8/1992 |
| JP | 05-508104 | 11/1993 |
| JP | 06-300393 | 10/1994 |
| JP | 07-047222 | 2/1995 |
| JP | 2002-001046 | 1/2002 |
| JP | 2002-021710 | 1/2002 |
| JP | 2003-120513 | 4/2003 |
| JP | 2007-262909 | 10/2007 |
| JP | 2010-159952 | 7/2010 |
| JP | 2013064330 | 4/2013 |
| JP | 2013068181 | 4/2013 |
| WO | WO 92/19358 | 11/1992 |

OTHER PUBLICATIONS

International Search Report, PCT/JP2012/006703, Jan. 29, 2013.

* cited by examiner

MIXED AIR REMOVAL DEVICE AND POWER GENERATOR INCLUDING THE SAME

TECHNICAL FIELD

The present invention relates to a device for removing air mixed into an organic gas.

BACKGROUND ART

Nowadays, as an energy recovery apparatus, attention is particularly being directed to a power generator that uses a low-boiling-point medium for generating power by recovering thermal energy from a low temperature heat source which has not been utilized for conventional geothermal power generation that uses a steam turbine (see Patent Document 1).

FIG. 4 illustrates a basic system diagram of a conventional power generator that uses a low-boiling-point medium. In this power generator, heat is exchanged between a medium having a boiling point lower than that of water and a heat source through an evaporator 100 to evaporate the medium and rotate a turbine 101 by vapors from the medium, so that the resulting rotational force activates a generator 102 to obtain electric power. The medium discharged from the turbine is condensed in a second condenser 103, passed through a preheater 105 by a circulating pump 104, and then sent to the evaporator 100 again so as to repeat the above-described cycle.

In general, when a medium having a high vapor pressure (i.e., a low boiling point) is used, the medium is easily vaporized in an evaporator but has difficulty in being condensed in a condenser. To the contrary, when a medium having a low vapor pressure (i.e., a high boiling point) is used, the medium has difficulty in being vaporized but is easily condensed. In terms of turbine work efficiency, a medium that increases an enthalpy difference (heat drop) between turbine inlet and outlet to the extent possible is selected as a medium to be used. For example, as a natural medium to be used at a geothermal heat source temperature of 130° C. to 140° C. and at a cooling source temperature of 15° C. to 30° C., n-pentane ($nC_5H_{12}$) is mainly utilized.

Circulating cooling water or the atmosphere is a common cooling source for a condenser, and therefore, a temperature of the cooling source is widely varied between winter and summer. Hence, when a condenser is designed based only on cooling performance required in summertime, cooling performance of the condenser is further enhanced upon reduction in cooling source temperature in wintertime.

However, as illustrated in FIG. 3, a vapor pressure of n-pentane is 101 kPa or less at a temperature of 36° C. or less, and therefore, a pressure of a medium passage might be equal to or lower than atmospheric pressure when a temperature of a condenser outlet is 36° C. or less in wintertime. In that case, air might be mixed into the medium passage from a condenser main body, various joints of its connection piping or a mechanical seal portion of a turbine shaft. Such air intrusion increases a turbine outlet pressure, resulting in a reduction in efficiency.

Therefore, devices disclosed in Patent Documents 2 to 6 are each known as a device for removing air mixed into a medium in an apparatus related to power generation.

Patent Document 2 discloses a binary power generator that uses water instead of a low-boiling-point medium and includes an air extracting device for extracting air from water discharged from a condenser.

Patent Document 3 discloses a power system including a power cycle circuit through which a working fluid provided by mixing a high-boiling-point medium with a low-boiling-point medium circulates in the following order: a steam generator for generating steam by heating a solution of the working fluid; a steam turbine driven by the steam supplied from the steam generator; a condenser for condensing steam, discharged from the steam turbine, into a solution by cooling the steam; and a supply pump for supplying, to the steam generator, the solution supplied from the condenser, wherein a concentration of the low-boiling-point medium in the working fluid in the condenser is decided so that a minimum pressure which can be caused in the condenser in the power cycle circuit is brought close to atmospheric pressure.

Patent Document 4 discloses a device including: a chamber including a piston therein and located above a condenser; a valve through which the condenser and space of the chamber located below the piston are connected to each other; a cooling means for cooling, via a wall, a lower portion of the chamber with a coolant; and a discharge valve connected to the lower portion of the chamber.

Patent Documents 5 and 6 each disclose a device including: an enclosed chamber located above a condenser; a movable diaphragm which is provided in the chamber and by which inside of the chamber is divided into an upper portion and a lower portion; two flow control valves disposed in series between the condenser and the lower portion of the chamber; a cooling means for cooling, via a wall, the lower portion of the chamber with a coolant; and a discharge valve connected to the lower portion of the chamber.

Patent Document 7 discloses an organic vapor-containing exhaust gas processing method including: compressing and cooling, using a compressor and a cooler, a condensable organic vapor-containing gas from a supply line, thus liquefying and recovering organic vapors; guiding a non-condensable gas, which remains in a compressed and cooled state, to a gas separation membrane module to separate the gas into an organic vapor concentrated gas and an organic vapor diluted gas; returning the organic vapor concentrated gas to the supply line and discharging the organic vapor diluted gas while measuring an organic vapor concentration in the organic vapor diluted gas; and controlling, in accordance with the organic vapor concentration, a compression pressure applied by the compressor or a cooling temperature provided by the cooler.

Patent Documents 8, 9 and 10 each disclose an example of using a silicone rubber-based polyimide composite membrane as a gas separation membrane module for allowing organic vapors to permeate through a membrane so as to concentrate and recover the organic vapors.

Patent Document 9 discloses an organic vapor-containing exhaust gas processing method including: pressurizing an organic vapor-containing exhaust gas by a compressor and guiding the gas to a cooler; condensing and recovering organic vapors in the cooler; guiding a low concentration gas, which has been obtained after the organic vapor recovery, to a gas separation membrane module to perform a separation process; and returning an organic vapor concentrated gas to an inlet side of the compressor and discharging an organic vapor diluted gas into the atmosphere.

Patent Document 10 discloses an organic solvent vapor recovering and processing method including: supplying an organic solvent vapor-containing mixture gas to a selectively permeable membrane module through which the gas permeates and concentrates; and cooling and condensing the concentrated gas to recover an organic solvent in the liquid phase, wherein the method includes: increasing an organic solvent concentration in a non-condensable gas in the cooling and condensing step so that this organic solvent concentration is higher than an organic solvent concentration in a non-permeable gas in the membrane module; returning the non-condensable gas to a supply side for the mixture gas; and discharging the non-permeable gas in the membrane module.

PRIOR ART REFERENCE

Patent Document

Patent Document 1: JP-A-62-26304
Patent Document 2: JP-A-2003-120513
Patent Document 3: JP-A-2007-262909
Patent Document 4: U.S. Pat. No. 5,119,635
Patent Document 5: U.S. Pat. No. 5,113,927
Patent Document 6: U.S. Pat. No. 5,487,765
Patent Document 7: JP-A-7-47222
Patent Document 8: JP-A-4-219113
Patent Document 9: JP-A-4-180811
Patent Document 10: JP-A-3-56113

SUMMARY OF THE INVENTION

Problems to be Solved by the Invention

In Patent Document 2, water is used as a medium, and therefore, a heat source must have a temperature of 100° C. or more, which unfortunately makes a heat source having a lower temperature unusable.

In Patent Document 3, the concentration of the low-boiling-point medium is decided so that the minimum pressure which can be caused in the condenser during wintertime is brought close to atmospheric pressure, and therefore, a pressure of the condenser during summertime is increased, which adversely causes a reduction in power generation efficiency.

In Patent Documents 4, 5 and 6, a device for removing air from a medium is disclosed, but as for activation timing of the device, each of these documents merely mentions an example where the device is activated at regular intervals of 20 minutes; therefore, an air removal operation is performed more than necessary, which unfortunately increases an amount of loss of the medium incident to discharged air.

In Patent Documents 7, 8 and 10, the compressor is provided at a primary side of the membrane, and in addition, a vacuum pump is provided at a secondary side of the membrane, which disadvantageously increases facility and operating costs.

In view of the above-described problems, an object of the present invention is to provide a mixed air removal device capable of removing air from a mixture gas of an organic gas and air, and reducing an amount of the organic gas discharged to outside of the device.

Solution to the Problems

To remove air from a mixture gas of an organic gas and the air, a mixed air removal device according to the present invention includes: a reservoir that reserves the mixture gas; a pressure container; a first pressure gauge that measures a pressure inside the pressure container; a pump that supplies the mixture gas from the reservoir to the pressure container; a first piping through which the reservoir and the pump are connected to each other; a second piping through which the pump and the pressure container are connected to each other; a membrane unit that comprises a gas separation membrane through which the organic gas permeates at a speed higher than that of air; a third piping through which a supply gas inlet of the membrane unit and the pressure container are connected to each other; a first valve provided in the third piping; and a controller, wherein with the first valve closed, the controller activates the pump to supply the mixture gas to the pressure container until a value measured by the first pressure gauge reaches a set upper limit value, and when the value measured by the first pressure gauge exceeds the set upper limit value, the controller opens the first valve to supply the mixture gas to the membrane unit.

In such an embodiment, the pressure inside the pressure container can be increased irrespective of an allowable pressure limit for the membrane unit. The higher the pressure, the greater the amount of the organic gas liquefied inside the pressure container can be.

In another embodiment, the mixed air removal device further includes: a fourth piping connected to a supply gas outlet of the membrane unit; a pressure regulator provided in the fourth piping; and a second pressure gauge that measures a pressure of a supply side of the membrane unit. The controller controls an opening of the first valve such that a value measured by the second pressure gauge approaches a supply side pressure target value. The supply side pressure target value for the membrane unit is set freely as long as it is lower than an allowable pressure value for the membrane unit. The higher the supply side pressure target value, the more preferable it is.

In such an embodiment, the pressure of the supply gas side of the membrane unit can be held constant, thus making it possible to increase the pressure inside the pressure container irrespective of the allowable pressure limit for the membrane unit.

In still another embodiment, the mixed air removal device further includes a fifth piping that is communicated with an inlet of the pump from a permeation side of the membrane unit.

In such an embodiment, the permeation side of the membrane unit can be sucked by the pump. Then, a movement speed of the organic gas permeating through the membrane can be increased.

In yet another embodiment, the mixed air removal device further includes: a third pressure gauge that measures a pressure of the permeation side of the membrane unit; a second valve provided in the fifth piping; and a third valve provided in the first piping. The controller closes the third valve and controls an opening of the second valve such that a difference between a pressure value measured by the second pressure gauge and a pressure value measured by the third pressure gauge is equal to or lower than an allowable pressure difference limit for the membrane unit.

In such an embodiment, the controller can control the second valve such that a pressure difference between the supply side and the permeation side of the membrane unit is increased, while ensuring that the pressure difference is equal to or lower than the allowable pressure difference limit for the membrane unit.

In still yet another embodiment, a first condenser is provided in the second piping.

In such an embodiment, liquefaction of the organic gas in the mixture gas introduced into the pressure container can be promoted.

In another embodiment, the mixed air removal device further includes: a level gauge that measures a liquid level of a liquid phase inside the pressure container; a sixth piping through which a lower portion of the pressure container and the reservoir are connected to each other; and a fourth valve provided in the sixth piping.

In such an embodiment, the organic gas retained and liquefied inside the pressure container can be returned to the reservoir.

In still another embodiment, the mixed air removal device further includes: an air supplier; a seventh piping through which the air supplier and the pressure container are connected to each other; and a fifth valve provided in the seventh piping.

In such an embodiment, the air is supplied from the air supplier to the pressure container, thus making it possible to dilute a concentration of the organic gas in the mixture gas inside the pressure container so that this concentration is equal to or lower than an allowable organic gas concentration for the membrane unit.

In yet another embodiment, the mixed air removal device further includes: a fourth pressure gauge that measures a pressure inside the reservoir; and a thermometer that measures a temperature inside the reservoir. The controller calculates a pressure threshold value by adding a margin value to a saturation vapor pressure value of the organic gas which is calculated based on the temperature measured by the thermometer. When a pressure value measured by the fourth pressure gauge is equal to or higher than the pressure threshold value, the controller detects that an air has intruded into the reservoir.

In such an embodiment, mixing of air into the mixture gas inside the reservoir can be automatically detected.

In still yet another embodiment, the mixed air removal device further includes: a combustor that combusts a residual gas discharged from the supply side of the membrane unit; an air supplier; an eighth piping through which the air supplier and the combustor are connected to each other; and a sixth valve provided in the eighth piping, wherein the controller controls an opening of the sixth valve based on an output signal from the second pressure gauge.

In such an embodiment, a flow rate of air supplied from the air supplier to the combustor is controlled by adjusting the opening of the sixth valve, and therefore, the residual gas discharged from the supply side can be completely combusted. Note that the combustor, the eighth piping and the sixth valve are not essential components.

In another embodiment, a power generator includes: the mixed air removal device; and a medium circulation passage through which an evaporator, a turbine, a second condenser and a circulating pump are connected to each other, wherein the reservoir is connected to the medium circulation passage.

In such an embodiment, air in a mixture gas passage can be automatically removed, thus making it possible to enhance power generation efficiency of the power generator.

In still another embodiment, the power generator further includes: a ninth piping connected to an inlet of the second condenser from the permeation side of the membrane unit or the fifth piping; a seventh valve provided in the ninth piping; and a fifth pressure gauge that measures a pressure of the inlet of the second condenser, and wherein the controller opens the seventh valve when a pressure value measured by the second pressure gauge is higher than a pressure value measured by the fifth pressure gauge.

In such an embodiment, load on the pump can be reduced, and thus electric power consumed by the pump can be reduced.

Note that a low-boiling-point organic gas having a boiling point lower than that of water is preferably used as the organic gas used in the present invention. For example, n-pentane, R134a, R245fa, HFO1234ze or the like may be used.

Effects of the Invention

According to the present invention, a mixture gas is compressed in a pressure container, and the compressed gas is supplied to a membrane unit via a pressure-reducing regulator valve, thus making it possible to increase a pressure of the pressure container irrespective of an allowable pressure value for the membrane unit, and to increase an amount of an organic gas condensed in the pressure container. As a result, an amount of the organic gas discharged to outside of a device can be reduced.

MODE FOR CARRYING OUT THE INVENTION

Figure 1:
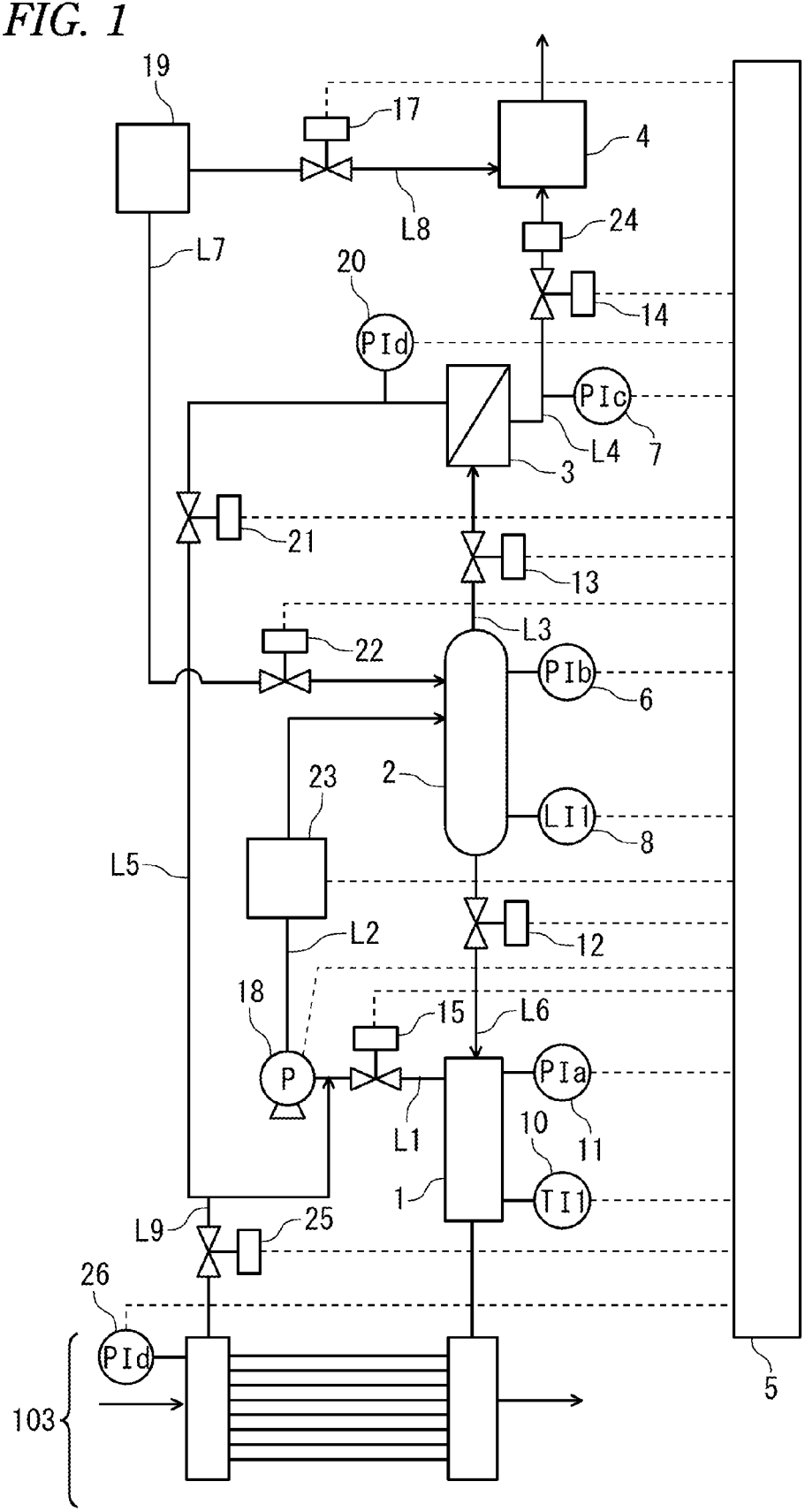
FIG. 1 is a diagram illustrating a configuration of a device according to an embodiment of the present invention.

Hereinafter, an embodiment of the present invention will be described with reference to the drawings. FIG. 1 is a diagram illustrating a configuration of a mixed air removal device according to the embodiment of the present invention.

Figure 4:
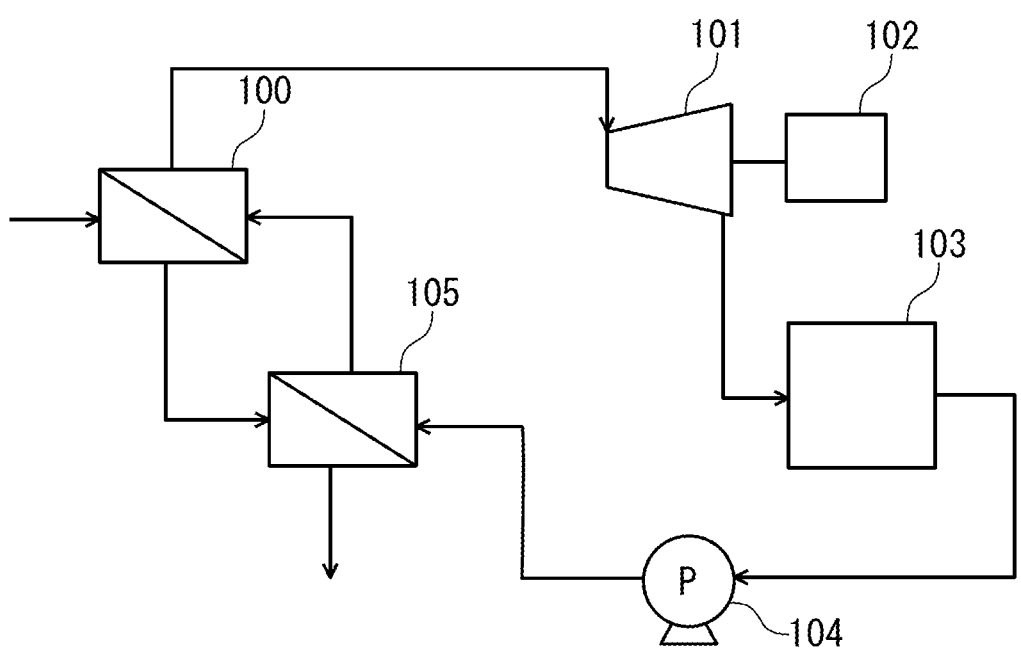
FIG. 4 is a diagram illustrating a configuration of a power generator in which a conventional and common low-boiling-point medium is used.

A second condenser 103 in FIG. 1 corresponds to a second condenser 103 in FIG. 4. A reservoir 1 is connected to an upper portion of an outlet side collector of the second condenser 103, and is equipped with: a thermometer 10 that measures a temperature of the reservoir 1; and a pressure gauge 11 that measures a pressure of the reservoir 1. An upper portion of the reservoir 1 and an inlet of a pump 18 are connected to each other through piping L1. The pump 18 and a pressure container 2 are connected to each other through piping L2. A first condenser 23 is provided somewhere along the piping L2. The first condenser 23 is not an essential component, but it is preferable that the first condenser 23 be provided in order to promote condensation of an organic gas.

The pressure container 2 is equipped with a first pressure gauge 6 and a level gauge 8. An upper portion of the pressure container 2 and a supply gas inlet of a membrane unit 3 are connected to each other through piping L3. A valve 13 is provided somewhere along the piping L3.

A supply gas outlet of the membrane unit 3 and a combustor 4 are connected to each other through piping L4. A valve 14 and a pressure regulator 24 are provided somewhere along the piping L4. A pressure gauge 7 that measures a pressure of a supply side (supply gas passage side) of the membrane unit 3 is provided in a portion of the piping L4 which is located between the valve 14 and the membrane unit 3.

As a membrane of the membrane unit 3, a separation membrane through which an organic gas is more permeable than at least nitrogen and oxygen that are main components of air may be appropriately selected and used. The higher the speed of permeation of an organic gas through the separation membrane with respect to the speed of permeation of nitrogen or oxygen therethrough, the higher the organic gas recovery rate can be. As a material for the separation membrane, silicone rubber, for example, may be used. The separation membrane may be formed into a hollow fiber membrane having an inner diameter of 170 μm to 200 μm and an outer diameter of 250 μm to 360 μm.

The pressure regulator 24 is provided in order to bring the supply side of the membrane unit 3 to a pressurized state compared with the atmosphere. As the pressure regulator 24, an orifice or a pressure reducing valve, for example, may be used.

An air supplier 19 and the combustor 4 are connected to each other through piping L8. A valve 17 is provided somewhere along the piping L8.

Piping L5 is connected to a permeation side of the membrane unit 3 and a portion of the piping L1 located at an inlet side of the pump 18. A valve 15 is provided in a portion of the piping L1 which is located between this connection and the reservoir 1.

A valve 21 is provided somewhere along the piping L5, and a pressure gauge 20 that measures a pressure of the permeation side (permeation gas passage side) of the membrane unit 3 is provided in a portion of the piping L5 which is located between the valve 21 and the membrane unit 3.

Piping L9 is branched off from the piping L5 and connected to an inlet of the second condenser 103. A valve 25 is provided somewhere along the piping L9. Alternatively, the piping L9 may be connected to the inlet of the second condenser 103 from the permeation side of the membrane unit 3. A pressure gauge 26 that measures a pressure of an inlet side collector portion of the second condenser 103 is provided. When a pressure value measured by the pressure gauge 7 is higher than a pressure value measured by the pressure gauge 26, the valve 25 is opened. In that case, an opening of the valve 25 is preferably controlled so that a pressure difference between supply side and permeation side of the membrane does not exceed an allowable pressure difference limit for the membrane.

A lower portion of the pressure container 2 and the reservoir 1 are connected to each other through piping L6. A valve 12 is provided somewhere along the piping L6. A liquid resulting from the condensed organic gas inside the pressure container 2 is returned to the reservoir through the piping L6, and is further returned to a mixture gas passage communicated with the reservoir. Note that a position at which the mixture gas passage and the reservoir are communicated with each other is preferably located at the outlet collector of the second condenser 103, but is not limited to this location.

The air supplier 19 and the pressure container 2 are connected to each other through piping L7. A valve 22 is provided somewhere along the piping L7.

A controller 5 is connected via signal lines to the thermometer 10, the pressure gauges 11, 6, 7, 20 and 26, and the level gauge 8, so that signals from the measuring instruments are fed to the controller 5. The controller 5 is connected via electric wires to the valves 12, 13, 14, 15, 17, 21, 22 and 25, and controls opening and closing of each of these valves. The controller 5 further controls the pump 18 and the first condenser 23. The first condenser 23 at least includes a heat exchanger that air-cools a mixture gas supplied from the pump 18, and more preferably further includes a fan that blows air against the heat exchanger so as to provide forced air cooling. Alternatively, the first condenser 23 may include a cooling machine that uses a Peltier device and/or a heat pump so as to provide active cooling.

Figure 2:
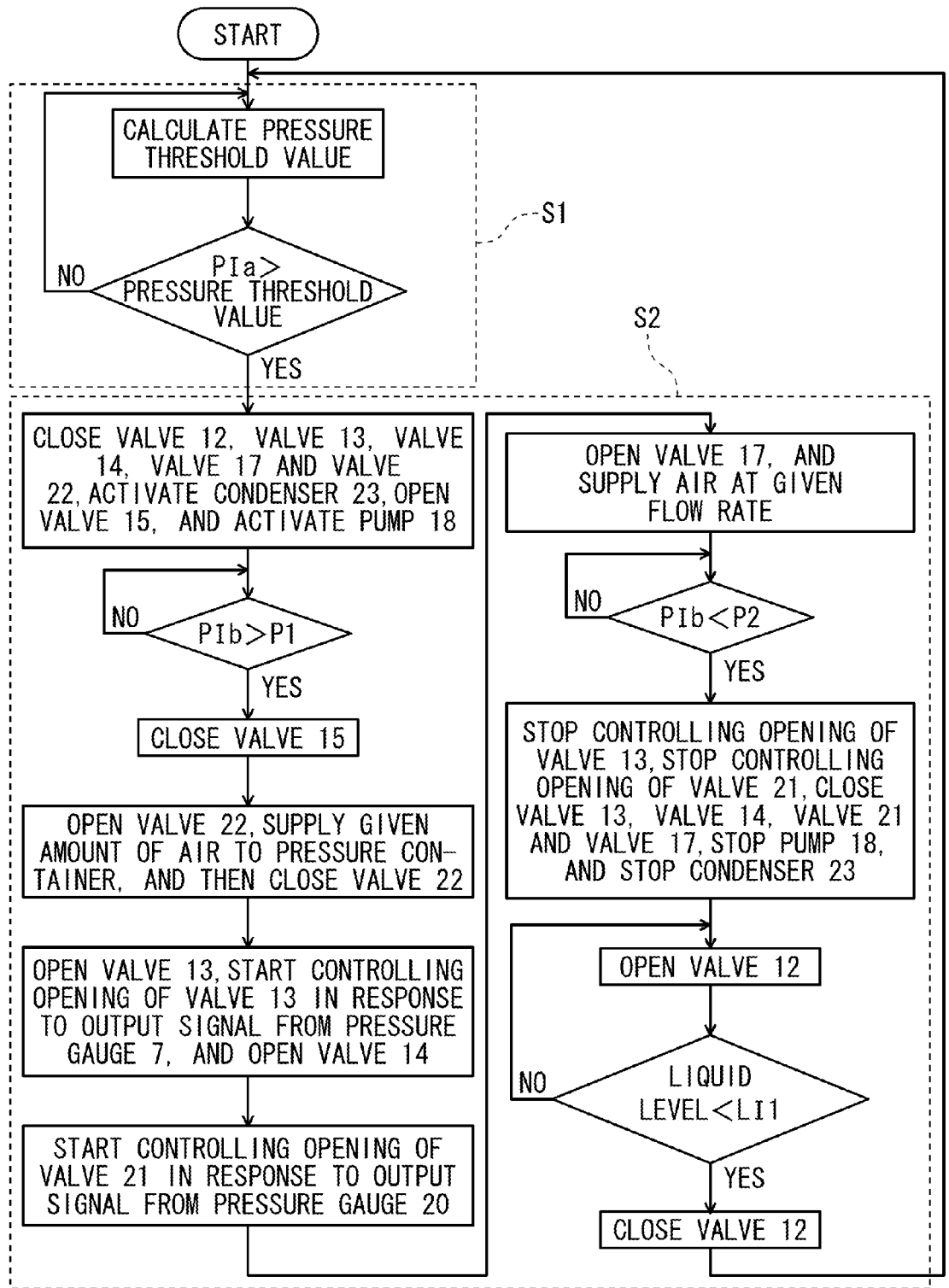
FIG. 2 is a flowchart illustrating an operation sequence of the device according to the embodiment of the present invention.

Next, operations of the present device will be described. FIG. 2 is a flowchart illustrating outlines of an operation sequence of the mixed air removal device according to the embodiment of the present invention. As illustrated in FIG. 2, the controller 5 carries out an air mixture detection process S1 and an air removal process S2 in this order, and then returns the sequence to the air mixture detection process S1. Note that all the valves are closed in an initial state.

Figure 3:
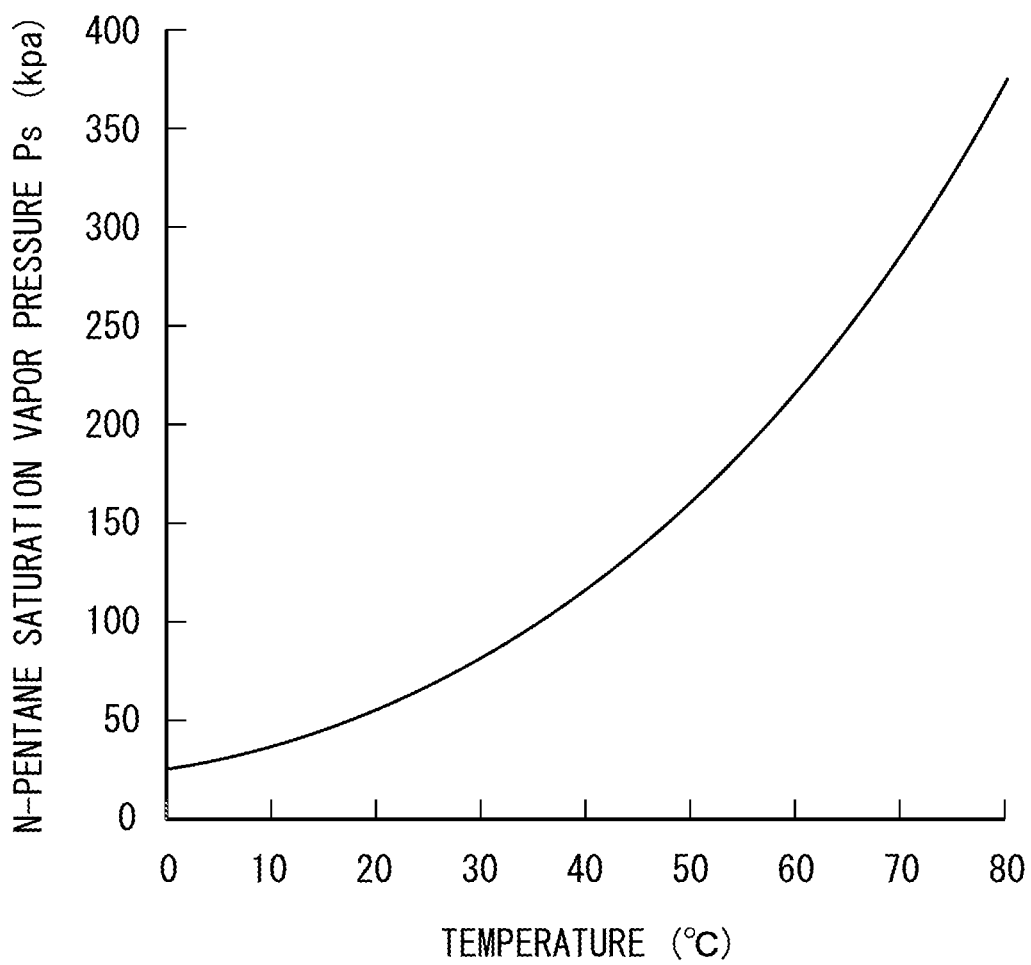
FIG. 3 is a diagram illustrating a saturation vapor pressure of n-pentane.

First, the air mixture detection process S1 will be described. The controller 5 initially acquires a signal from the pressure gauge 11 provided at the reservoir 1 and a signal from the thermometer 10 provided at the reservoir 1, and calculates a pressure threshold value by adding a margin value to a saturation vapor pressure value of the organic gas which is calculated based on the temperature measured by the thermometer 10. When a pressure value (P1a) measured by the pressure gauge 11 is equal to or lower than the pressure threshold value, the sequence returns to the initial step of the air mixture detection process S1. When the pressure value (P1a) measured by the pressure gauge 11 is higher than the pressure threshold value, it is determined that air is mixed into a medium, and the sequence proceeds to the next step. The margin value is a fixed value, or a proportional value obtained by multiplying the saturation vapor pressure value of the organic gas, calculated based on the temperature measured by the thermometer 10, by a factor. Specifically, in the case of n-pentane, for example, a saturation vapor pressure value (Pst) at a temperature (T1) is computed using the following Eq. 1. The saturation vapor pressure value (Pst) of n-pentane is presented in graphical form in FIG. 3. When a different organic gas is used, the equation for obtaining the saturation vapor pressure value (Pst) is appropriately changed in accordance with characteristics of the organic gas.

$$Pst=0.0003(T1)^3+0.0159(T1)^2+1.1844(T1)+24.316 \qquad (1)$$

The margin value is determined by performing several experiments in consideration of the number of joints and/or states thereof. For example, when the margin value is a fixed value, the margin value is about 10% of the saturation vapor pressure value at 1 atmospheric pressure. When the margin value is a proportional value, the factor is about 0.1.

Next, the air removal process S2 will be described. The main points of this process are that the mixture gas is compressed in the pressure container, and the compressed gas is supplied to the membrane unit via a pressure-reducing regulator valve, thus increasing the pressure inside the pressure container irrespective of an allowable pressure value for the membrane unit. As a result, an amount of the organic gas condensed in the pressure container can be increased.

In the air removal process S2, first, the valves 12, 13, 14, 17 and 22 are closed, the first condenser 23 is activated, the valve 15 is opened, and the pump 18 is activated. Thus, the mixture gas reserved in the reservoir 1 is transferred to the pressure container 2. In this case, when the mixture gas is cooled by the first condenser 23, liquefaction of the organic gas in the mixture gas can be promoted.

Next, a comparison is made between a pressure value P1b measured by the pressure gauge 6 and a pressure container upper limit pressure value P1. When the pressure value P1b is equal to or lower than the pressure container upper limit pressure value P1, the sequence returns to a point immediately preceding this comparison step, and the pump 18 continues to operate. On the other hand, when the pressure value P1b is higher than the pressure container upper limit pressure value P1, the valve 15 is closed such that the pressure of the pressure container 2 does not increase. In consideration of pressure resistance performance of the pressure container 2, the pump 18, the first condenser 23 and each valve, the pressure container upper limit pressure value P1 is set freely as long as it does not exceed a pressure resistance value of each instrument. The amount of the organic gas liquefied and recovered in the pressure container 2 can be increased as the pressure container upper limit pressure value P1 is increased to the extent possible.

Next, the valve 22 is opened to supply a given amount of air to the pressure container, and then the valve 22 is closed. An allowable organic gas concentration for the membrane used in the membrane unit 3 varies depending on a material of the membrane. Therefore, when an organic gas concentration in the mixture gas inside the pressure container 2 exceeds an upper limit of the allowable organic gas concentration for the membrane unit 3, air is preferably supplied to the pressure container 2 as mentioned above to dilute the organic gas concentration in the mixture gas so that the organic gas concentration is equal to or lower than the allowable organic gas concentration for the membrane unit 3. When it is known in advance that the organic gas concentration in the mixture gas inside the pressure container 2 does not exceed the upper limit of the allowable organic gas concentration for the membrane of the membrane unit 3, this step may be skipped.

Next, the valve 13 is opened, and an operation for controlling an opening of the valve 13 in response to an output signal from the pressure gauge 7 is started. The opening of the valve 13 is controlled so that the pressure value measured by the pressure gauge 7 is brought close to a supply side pressure target value. The recovery rate of the organic gas in the membrane unit 3 can be increased as the supply side pressure is maintained at a high level in the above-described manner. Then, the valve 14 is opened. Alternatively, instead of controlling the opening of the valve 13 using the pressure gauge 7, a pressure reducing valve may be provided in a portion of the piping L3 which is located between the pressure container 2 and the membrane unit so that the supply side pressure of the membrane unit 3 is reduced to reach a constant value.

A driving force for movement of the organic gas through the membrane unit 3 is produced as a result of a pressure difference between the supply side and the permeation side of the membrane. Accordingly, the greater the pressure difference, the more preferable it is, and therefore, it is more desirable to control the pressure difference so that the pressure difference does not exceed an allowable pressure difference limit for the membrane. The pump 18 serves to reduce the permeation side pressure of the membrane unit 3 via the piping L5. Therefore, an operation for controlling an opening of the valve 21 in response to an output signal from the pressure gauge 20 is started. The permeation side pressure is measured by the pressure gauge 20, and the opening of the valve 21 is controlled so that the pressure difference reaches a value lower than the allowable pressure difference limit for the membrane.

Next, the valve 17 is opened to supply air at a given flow rate. This air is used for combustion of the organic gas in the combustor 4. Accordingly, the flow rate of the air is adjusted so as to enable complete combustion of the organic gas supplied to the combustor 4. As for the given flow rate, no air flowmeter has to be provided when a discharge pressure of the air supplier is held constant and the flow rate of air, flowing through the piping L8 in accordance with the opening of the valve 17, is measured in advance.

Next, a comparison is made between the pressure value P1b measured by the pressure gauge 6 and a pressure container lower limit pressure value P2. When the pressure value P1b is equal to or higher than the pressure container lower limit pressure value P2, the sequence returns to a point immediately preceding this comparison step. When the pressure value P1b is lower than the pressure container lower limit pressure value P2, the sequence goes to the next step. The pressure container lower limit pressure value P2 serves as a threshold value used for detection of a reduction in gas supply to the membrane unit 3 which is caused by a drop in pressure inside the pressure container 2. As the pressure container lower limit pressure value, a value higher than the pressure value of the reservoir 1 at the time of activation of the present device is set in advance.

Next, the operations for controlling the openings of the valve 13 and the valve 21 are stopped, the valves 13, 14, 21 and 17 are closed, and the pump 18 and the first condenser 23 are each stopped. Subsequently, the valve 12 is opened. Then, the liquefied organic gas stored in the lower portion of the pressure container 2 starts to move to the reservoir 1 through the piping L6.

Subsequently, a comparison is made between a liquid level position measured by the level gauge 8 and a lower limit liquid level L11 of the pressure container 2. When the liquid level position is equal to or higher than the lower limit liquid level L11, the sequence returns to a point preceding the step of opening the valve 12 which immediately precedes this comparison step. Thus, the amount of the liquefied organic gas stored inside the pressure container 2 is adjusted. Since there is a pressure difference between the inside of the pressure container 2 and the inside of the reservoir 1 due to the activation of the pump 18 mentioned above, this pressure difference causes the liquefied organic gas to move from the pressure container 2 to the reservoir 1.

On the other hand, when the liquid level position is lower than the lower limit liquid level L11, the valve 12 is closed. Then, the sequence returns to a point preceding the air mixture detection process 51.

By providing such device configuration and control, air can be removed from the mixture gas of the organic gas and air, and the amount of the organic gas discharged to outside of the device can be reduced.

The invention claimed is:

1. A mixed air removal device for removing air from a mixture gas of an organic gas and the air, the device comprising:
   a reservoir that reserves the mixture gas;
   a pressure container;
   a first pressure gauge that measures a pressure inside the pressure container;
   a pump that supplies the mixture gas from the reservoir to the pressure container;
   a first piping through which the reservoir and the pump are connected to each other;
   a second piping through which the pump and the pressure container are connected to each other;
   a membrane unit that comprises a gas separation membrane through which the organic gas permeates at a speed higher than that of air;
   a third piping through which a supply gas inlet of the membrane unit and the pressure container are connected to each other;
   a first valve provided in the third piping; and
   a controller, wherein with the first valve closed, the controller activates the pump to supply the mixture gas to the pressure container until a value measured by the first pressure gauge reaches a set upper limit value, and when the value measured by the first pressure gauge exceeds the set upper limit value, the controller opens the first valve to supply the mixture gas to the membrane unit.

2. The mixed air removal device according to claim 1, further comprising:
   a fourth piping connected to a supply gas outlet of the membrane unit;
   a pressure regulator provided in the fourth piping; and
   a second pressure gauge that measures a pressure of a supply side of the membrane unit,
   wherein the controller controls an opening of the first valve such that a value measured by the second pressure gauge approaches a supply side pressure target value.

3. The mixed air removal device according to claim 2, further comprising:
a fifth piping that is communicated with an inlet of the pump from a permeation side of the membrane unit.

4. The mixed air removal device according to claim 3, further comprising:
a third pressure gauge that measures a pressure of the permeation side of the membrane unit;
a second valve provided in the fifth piping; and
a third valve provided in the first piping,
wherein the controller closes the third valve and controls an opening of the second valve such that a difference between a pressure value measured by the second pressure gauge and a pressure value measured by the third pressure gauge is equal to or lower than an allowable pressure difference limit for the membrane unit.

5. The mixed air removal device according to claim 1, wherein a first condenser is provided in the second piping.

6. The mixed air removal device according to claim 1, further comprising:
a level gauge that measures a liquid level of a liquid phase inside the pressure container;
a sixth piping through which a lower portion of the pressure container and the reservoir are connected to each other; and
a fourth valve provided in the sixth piping.

7. The mixed air removal device according to claim 1, further comprising:
an air supplier;
a seventh piping through which the air supplier and the pressure container are connected to each other; and
a fifth valve provided in the seventh piping.

8. The mixed air removal device according to claim 1, further comprising:
a fourth pressure gauge that measures a pressure inside the reservoir; and
a thermometer that measures a temperature inside the reservoir, and
wherein the controller calculates a pressure threshold value by adding a margin value to a saturation vapor pressure value of the organic gas which is calculated based on the temperature measured by the thermometer, and
when a pressure value measured by the fourth pressure gauge is equal to or higher than the pressure threshold value, the controller detects that an air has intruded into the reservoir.

9. The mixed air removal device according to claim 2, further comprising:
a combustor that combusts a residual gas discharged from the supply side of the membrane unit;
an air supplier;
an eighth piping through which the air supplier and the combustor are connected to each other; and
a sixth valve provided in the eighth piping,
wherein the controller controls an opening of the sixth valve based on an output signal from the second pressure gauge.

10. A power generator comprising:
the mixed air removal device according to claim 1; and
a medium circulation passage through which an evaporator, a turbine, a second condenser and a circulating pump are connected to each other,
wherein the reservoir is connected to the medium circulation passage.

11. The power generator according to claim 10, further comprising:
a ninth piping connected to an inlet of the second condenser from the permeation side of the membrane unit or the fifth piping;
a seventh valve provided in the ninth piping; and
a fifth pressure gauge that measures a pressure of the inlet of the second condenser, and
wherein the controller opens the seventh valve when a pressure value measured by the second pressure gauge is higher than a pressure value measured by the fifth pressure gauge.

* * * * *